United States Patent
Tanaami et al.

(10) Patent No.: US 12,504,808 B2
(45) Date of Patent: Dec. 23, 2025

(54) INTERFACE APPARATUS AND HANG GLIDING EXPERIENCE SYSTEM

(71) Applicant: SINTOKOGIO, LTD., Nagoya (JP)

(72) Inventors: Yoshikane Tanaami, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 0 days.

(21) Appl. No.: 18/664,778

(22) Filed: May 15, 2024

(65) Prior Publication Data

US 2024/0393865 A1 Nov. 28, 2024

(30) Foreign Application Priority Data

May 26, 2023 (JP) ................................. 2023-087222

(51) Int. Cl.
*G06F 3/01* (2006.01)
*G02B 27/01* (2006.01)

(52) U.S. Cl.
CPC ............ *G06F 3/011* (2013.01); *G02B 27/017* (2013.01)

(58) Field of Classification Search
CPC .... G06F 3/011; G06F 3/016; G06F 2203/012; G02B 27/017; G01L 1/142; G06T 19/003
See application file for complete search history.

(56) References Cited

U.S. PATENT DOCUMENTS

| | | | | |
|---|---|---|---|---|
| 5,855,344 A | * | 1/1999 | Rogers | F16M 11/123 248/123.2 |
| 11,614,796 B1 | * | 3/2023 | Summit | A63F 13/245 345/633 |
| 2007/0075917 A1 | * | 4/2007 | Nishi | G02B 27/0176 345/8 |
| 2009/0256800 A1 | * | 10/2009 | Kaufman | G06F 3/011 715/700 |
| 2016/0275809 A1 | * | 9/2016 | Cho | G06F 3/011 |
| 2017/0072327 A1 | * | 3/2017 | Wach | A63G 31/16 |

FOREIGN PATENT DOCUMENTS

| | | | |
|---|---|---|---|
| JP | 2010012290 A | 1/2010 | |
| WO | WO-2006119979 A1 * | 11/2006 | ............... A63G 1/28 |

* cited by examiner

*Primary Examiner* — Lunyi Lao
*Assistant Examiner* — Jarurat Suteerawongsa
(74) *Attorney, Agent, or Firm* — Harness, Dickey & Pierce, P.L.C.

(57) ABSTRACT

An interface apparatus for providing a user with a hang gliding experience in a virtual space includes: a control bar which the user is to grip; a tilt mechanism which supports the control bar from above such that the control bar is tiltable; a force sensor that is provided to the tilt mechanism and that detects a force and a moment which are applied from the user to the control bar; and an input and output section that provides a signal indicative of the force and the moment to a simulation apparatus configured to generate the virtual space and that acquires, from the simulation apparatus, a control signal for controlling the tilt mechanism so as to tilt the control bar.

4 Claims, 3 Drawing Sheets

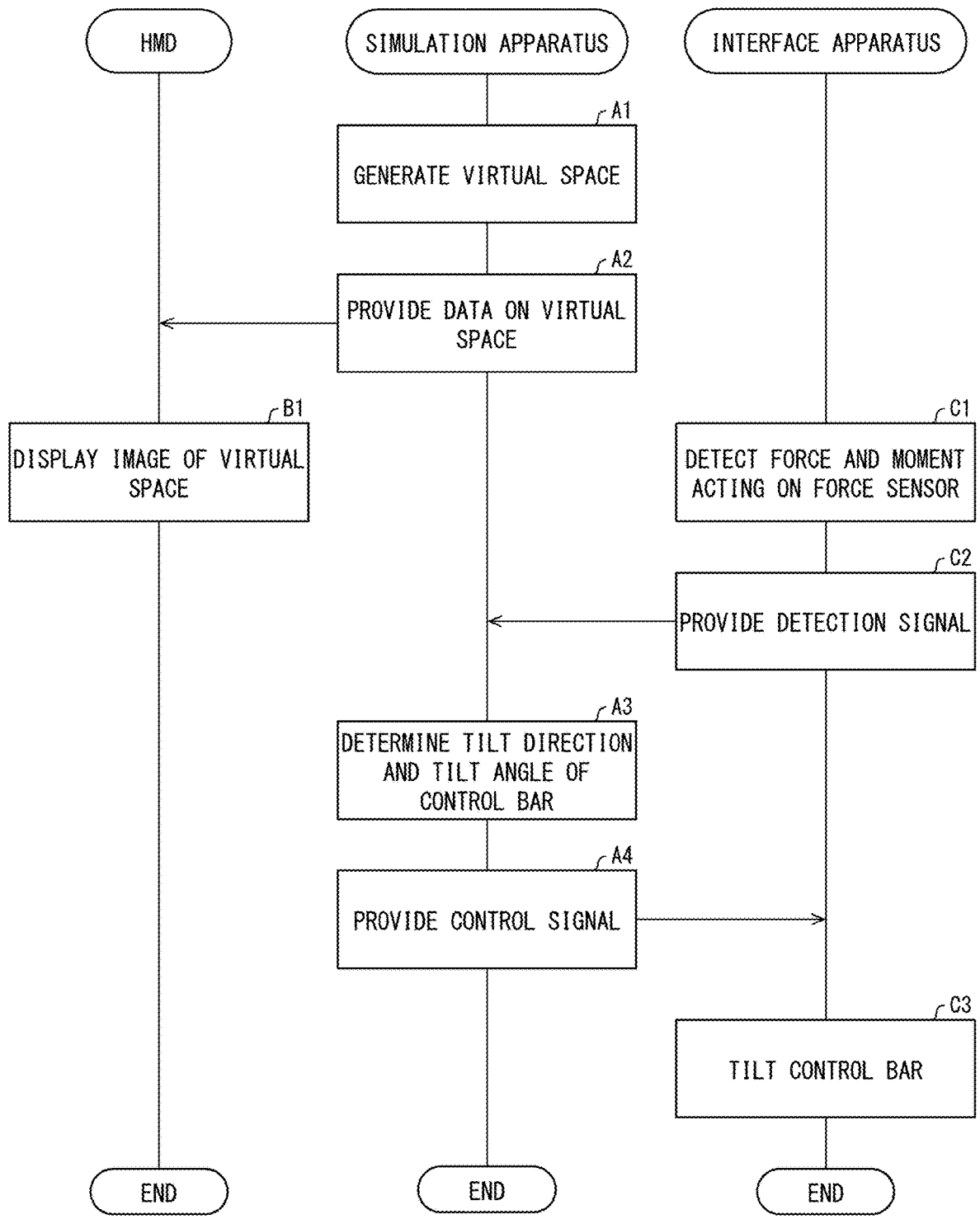

INTERFACE APPARATUS AND HANG GLIDING EXPERIENCE SYSTEM

This Nonprovisional application claims priority under 35 U.S.C. § 119 on Patent Application No. 2023-087222 filed in Japan on May 26, 2023, the entire contents of which are hereby incorporated by reference.

TECHNICAL FIELD

The present invention relates to an interface apparatus and a hang gliding experience system.

BACKGROUND ART

Conventionally, a simulation apparatus for an experience of simulated hang gliding, as disclosed in Patent Literature 1 has been known. This simulation apparatus is used together with a vision display apparatus that can display visions according to an orientation of a face of a user. In addition, this simulation apparatus includes a sensory driving section that controls a posture of a user in accordance with the visions displayed on the image display apparatus. The sensory driving section includes a control apparatus that tilts a part supporting the user in accordance with tilt of a body of the user who is to experience bodily sensation in view of the visions displayed on the image display apparatus.

CITATION LIST

Patent Literature

Patent Literature 1

Japanese Patent Application Publication Tokukai No. 2010-12290

SUMMARY OF INVENTION

Technical Problem

In real hang gliding, a user of an aircraft is swingably hung below the aircraft. Thus, the control bar fixed to the aircraft can be tilted relative to the user. This enables the user to tilt the control bar in a front, back, right, or left direction to accelerate or decelerate the aircraft or turn the aircraft in another direction. However, in the conventional simulation apparatus as disclosed in Patent Literature 1, a member corresponding to the control bar is fixed to a member supporting the user. Thus, the user of the simulation apparatus cannot tilt the control bar relative to the user. That is, merely using a conventional simulation apparatus in hang gliding in a virtual space provides an insufficiently realistic movement of the control bar and thus only provides an experience far from an experience in real hang gliding.

An aspect of the present invention has been achieved in light of the foregoing problem. It is an object of the aspect of the present invention to enable users to experience a more realistic movement of a control bar in hang gliding in a virtual space.

Solution to Problem

In order to solve the foregoing problem, an interface apparatus in accordance with an aspect of the present invention is an interface apparatus for providing a user with a hang gliding experience in a virtual space, the interface apparatus including: a control bar which the user is to grip; a tilt mechanism which supports the control bar from above such that the control bar is tiltable; a force sensor that is provided to the tilt mechanism and that detects a force and a moment which are applied from the user to the control bar; and an input and output section that provides a signal indicative of the force and the moment to a simulation apparatus configured to generate the virtual space and that acquires, from the simulation apparatus, a control signal for controlling the tilt mechanism so as to tilt the control bar.

Further, in order to solve the foregoing problem, a hang gliding experience system in accordance with another aspect of the present invention includes: the interface apparatus; and the simulation apparatus, the simulation apparatus determining a tilt direction of the control bar and a tilt angle of the control bar in view of a state of an atmosphere in the virtual space and a posture of the user which posture has been specified by the force and the moment.

Advantageous Effects of Invention

Each aspect of the present invention enables users to experience a more realistic movement of a control bar in hang gliding in a virtual space.

BRIEF DESCRIPTION OF DRAWINGS

FIG. 3 is a flowchart illustrating a flow of an operation of the system.

DESCRIPTION OF EMBODIMENTS

The following description will discuss an embodiment of the present invention in detail with reference to the drawings.

<Configuration of Hang Gliding Experience System>

Figure 1:
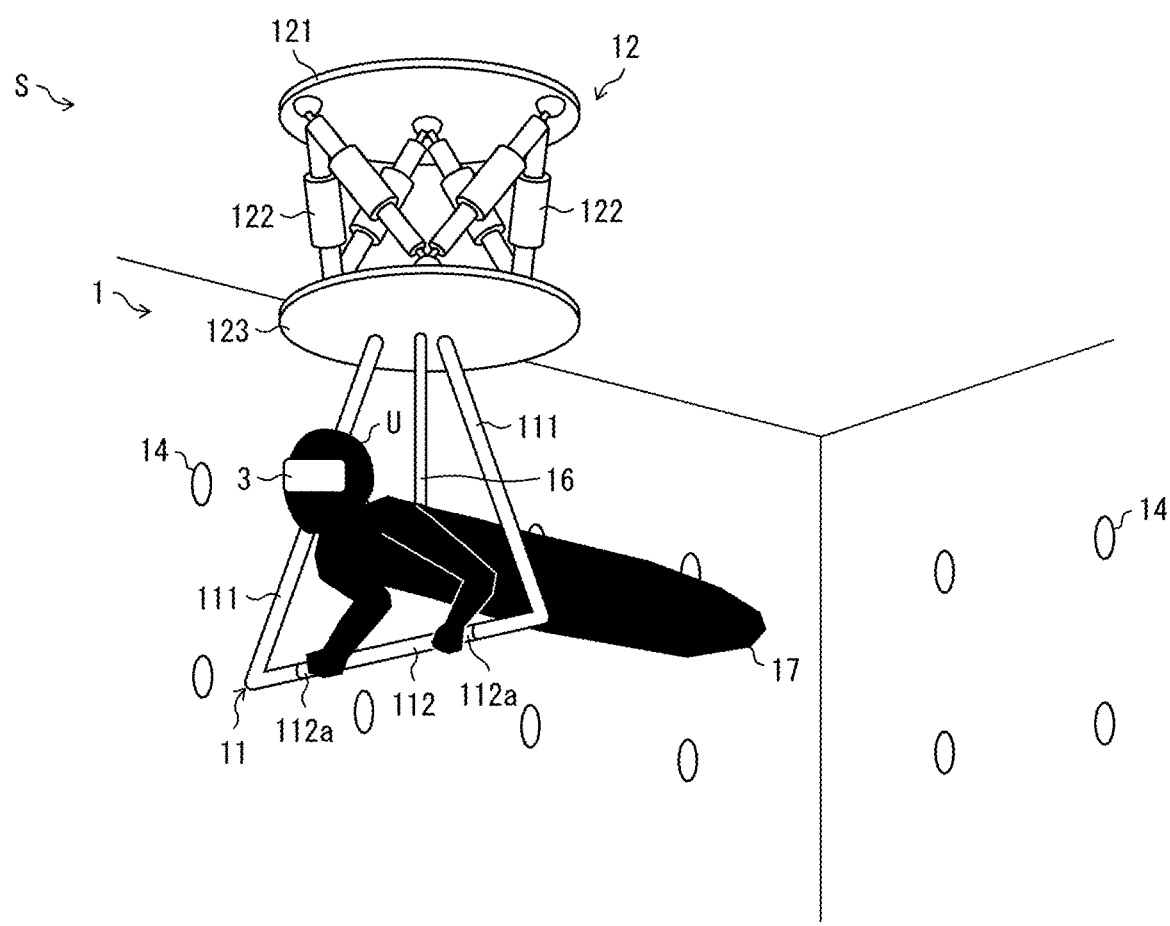
FIG. 1 is a perspective view illustrating an example of a hang gliding experience system in accordance with an embodiment of the present invention.
Figure 2:
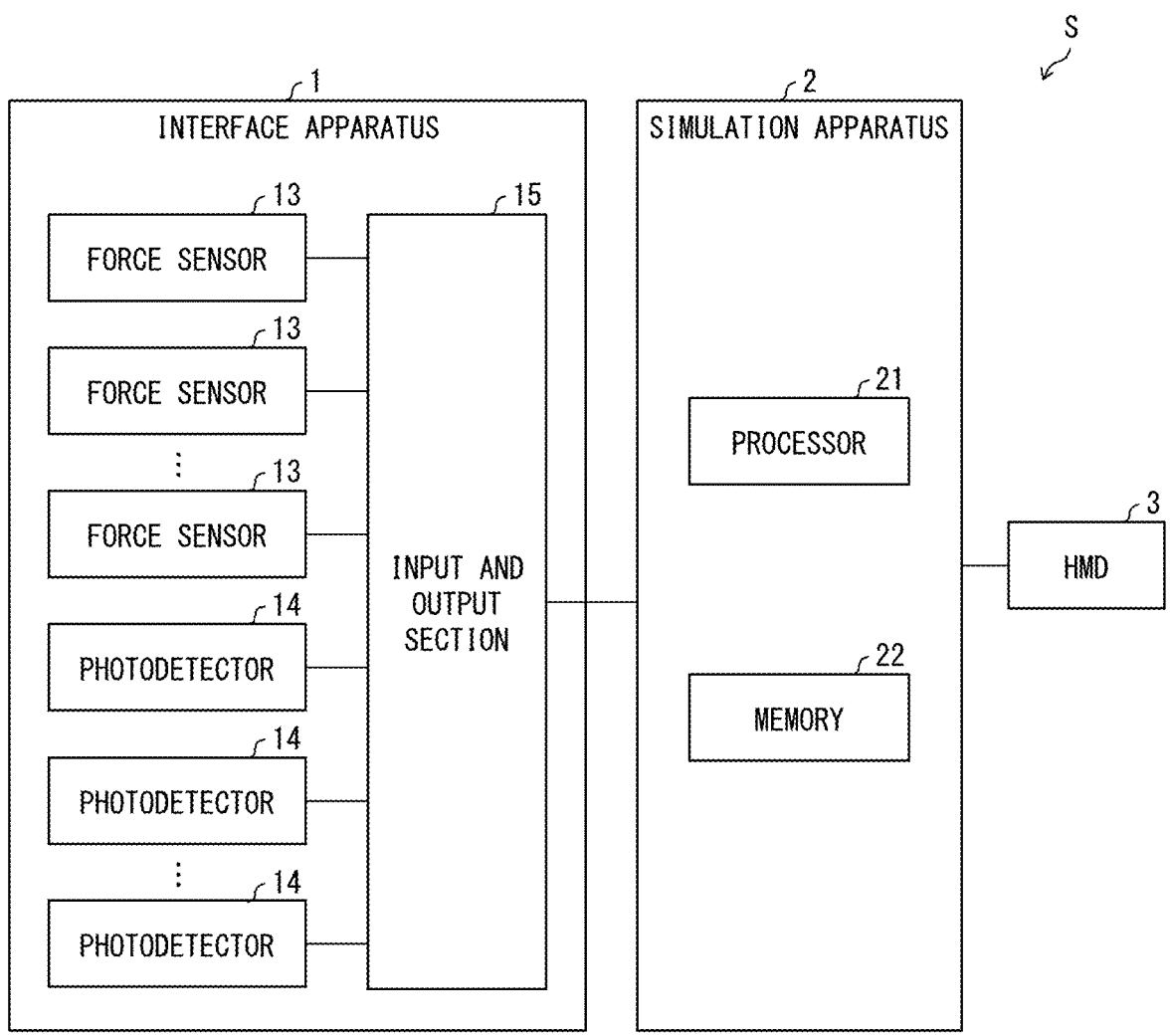
FIG. 2 is a block diagram illustrating an electrical configuration of the system.

A hang gliding experience system in accordance with the present embodiment (hereinafter, referred to as "system S") provides a user U with a hang gliding experience in a virtual space. As illustrated in FIGS. 1 and 2, the system S includes an interface apparatus 1, a simulation apparatus 2, and a head mounted display 3 (hereinafter, referred to as "HMD 3"). As illustrated in FIG. 2, the components 1 to 3 are communicably connected with each other in a wired or wireless manner. Note that the system S may include a plurality of interface apparatuses 1 and a plurality of HMDs 3. In this case, the plurality of interface apparatuses 1 may be installed in the same room or may be installed in different rooms.

[Interface Apparatus]

The interface apparatus 1 provides the user U with a hang gliding experience in a virtual space. As illustrated in FIG. 1, the interface apparatus 1 includes a control bar 11, a tilt mechanism 12, and at least one force sensor 13. As illustrated in FIGS. 1 and 2, the interface apparatus 1 in accordance with the present embodiment further includes a plurality of photodetectors 14, an input and output section 15, a hang strap 16, and a harness 17.

[Tilt Mechanism]

As illustrated in FIG. 1, the tilt mechanism 12 supports the control bar 11 from above such that the control bar 11 is tiltable. Thus, the tilt mechanism 12 is provided a predetermined distance (approximately several meters) above the floor surface. The tilt mechanism 12 in accordance with the present embodiment is fixed to the ceiling of a room in which the system S is installed. The tilt mechanism 12 in accordance with the present embodiment is a parallel link mechanism. Thus, the tilt mechanism 12 in accordance with the present embodiment includes a base 121 fixed to the ceiling, a plurality of movable links 122, and a tilt member 123.

(Movable Link)

The plurality of movable links 122 have upper end portions each coupled to a peripheral portion of the base 121. The upper end portions are movable joints (for example, ball joints). Therefore, the movable links 122 can each tilt with the upper end portion as a fulcrum thereof. Further, each of the movable links 122 is constituted by a piston and a cylinder. Thus, each of the movable links 122 can expand and contract such that the upper end portion and the lower end portion thereof move closer to and away from each other. Furthermore, as in the case of the upper end portions, the lower end portions of the plurality of movable links 122 are movable joints.

(Tilt Member)

A peripheral portion of the upper surface of the tilt member 123 is coupled with each of the lower end portions of the plurality of movable links 122. The tilt member 123 is tiltable in accordance with a degree of expansion and contraction of each of the movable links 122.

Note that the tilt mechanism 12 is not limited to the above configuration. For example, each of the movable links of the tilt mechanism may be configured to be able to be bent and straightened. In addition, the tilt member 123 may be configured to be tilted by adjusting a bending angle of each of the upper end portions of the movable links through, for example, power of a motor. Further, the tilt mechanism may be configured such that the upper end portions of the movable links each having a bar shape are movable along the lower surface of the base 121, and further the tilt member 123 is tilted by causing the lower end portions to move upward and downward by the movement of the upper end portions of the movable links.

[Control Bar]

The control bar 11 is provided under the tilt mechanism 12. The control bar 11 in accordance with the present embodiment includes a pair of uprights 111 and a base bar 112.

(Upright)

The upper end portions of the pair of uprights 111 are fixed to the tilt member 123 of the tilt mechanism 12. Further, the pair of uprights 111 extend downward such that the uprights 111 move away from each other.

(Base Bar)

The base bar 112 is to be gripped by a user. The both left and right end portions of the base bar 112 are fixed to the respective lower end portions of the pair of uprights 111. The base bar 112 in accordance with the present embodiment includes one or more operation parts 112a that can be operated by the user U. For example, the operation parts 112a may be buttons or may be sheet-like sensors attached to the base bar 112.

The control bar 11 coupled to the plurality of movable links 122 (in particular, the base bar 112) as above is tilted in accordance with tilt of the tilt member 123 of the tilt mechanism 12.

(Force Sensor)

The force sensor 13 detects a force and a moment which are applied from the user U to the control bar 11. The plurality of force sensors 13 in accordance with the present embodiment are capacitive force sensors and are provided to the tilt mechanism 12. Further, the force sensors 13 in accordance with the present embodiment are attached to the base 121 of the tilt mechanism 12. The force sensors 13 detect strain that occurs in the base 121 when the user U attempts to move the base bar 112. On the basis of the detection result, calculated are, for example, a force acting on the base bar 112 of the control bar 11, a moment about an X axis passing the tilt mechanism 12 in a front-back direction, and a moment about a Y axis passing the tilt mechanism 12 in a right-left direction, the moment about the X axis and the moment about the Y axis acting on the base bar 112. This enables the simulation apparatus 2 described later to specify, for example, a posture of the user U (whether the user U attempts to push or pull the base bar 112) and how the weight of the user U is applied (whether the user U attempts to turn the aircraft in a right or left direction). Each of the force sensors 13 repeatedly detects, at a predetermined cycle, the strain that occurs in the base 121, and a force and a moment that act on the control bar 11. Note that the force sensors 13 may be each a force sensor of a strain gauge type.

[Hang Strap]

The hang strap 16 hangs the harness 17 described later. The hang strap 16 may be a string-shaped member or may be a bar-shaped member which can swing with the upper end portion thereof as the center. The upper end portion of the hang strap 16 is fixed to a center portion of the lower surface of the tilt member 123 of the tilt mechanism 12. Further, the hang strap 16 extends downward. The hang strap 16 has a lower end portion provided with an engaging part (carabiner) that detachably engages with the harness 17. Note that the hang strap 16 may be provided in a position lying in a place on which the tilt mechanism 12 is provided (ceiling or the like) and beside (behind) the tilt mechanism 12.

[Harness]

The harness 17 is hung by the hang strap 16 and supports a trunk and legs of the user. The type of the harness 17 is not particularly limited. That is, the harness 17 may be of an apron type, an upright type, or a front-zipper type. A center part of the upper surface of the harness 17 is provided with an engaged part that is to engage with the engaging part of the hang strap 16.

[Photodetector]

The photodetectors 14 detect light emitted from the HMD 3 described later. The plurality of photodetectors 14 are provided so as to surround the interface apparatus 1. The photodetectors 14 in accordance with the present embodiment are provided on the walls of a room in which the interface apparatus 1 is installed. In addition, the photodetectors 14 in accordance with the present embodiment are provided in a matrix at a predetermined interval. Note that, for example, the photodetectors 14 may be provided so as to be obliquely aligned or may be provided randomly.

[Input and Output Section]

The input and output section 15 provides a detection signal to a simulation apparatus 2. The detection signal indicates the force and the moment. In addition, the input and output section 15 acquires, from the simulation apparatus 2, a control signal for controlling the tilt mechanism 12 so as to tilt the control bar 11. The input and output section 15 is constituted by a communication module that communicates with the simulation apparatus 2 in a wired or wireless manner or a terminal for wired connection with the simulation apparatus 2.

The input and output section 15 in accordance with the present embodiment provides the simulation apparatus 2 with identification information (for example, ID and an attachment position) of the photodetector 14 that has detected the light emitted by the HMD 3. Further, the input and output section 15 in accordance with the present embodiment provides the simulation apparatus 2 with a switching signal according to an operation performed for the operation parts 112a of the control bar 11.

[Simulation Apparatus]

The simulation apparatus 2 generates a virtual space. The simulation apparatus 2 in accordance with the present embodiment generates a virtual space designed to resemble an aerial space. As illustrated in FIG. 2, the simulation apparatus 2 includes a processor 21 and a memory 22.

(Memory)

The memory 22 stores a control program for causing the simulation apparatus 2 to operate. The memory 22 in accordance with the present embodiment also stores image data for generating the virtual space.

(Processor)

The processor 21 generates a virtual reality (VR) image designed to resemble the scenery in an aerial space. The processor 21 generates the VR image on the basis of graphics data obtained by taking a picture of a place to actually experience hang gliding. Further, the processor 21 generates an image of a virtual space in which the surrounding scenery is moving backward (which creates feeling as if the user U is flying). In addition, the processor 21 in accordance with the present embodiment specifies an orientation of the face of the user U on the basis of the identification information of the photodetector 14 that has detected the light and causes the virtual space to rotate in accordance with the orientation of the face of the user U. The processor 21 then transmits, to the HMD 3, data on the virtual space generated, via a communication module which is not illustrated. Further, in a case where the processor 21 acquires the switching signal from the interface apparatus 1, the processor 21 changes, in accordance with the switching signal, at least one selected from the group consisting of a location, an altitude, a flight velocity, and a sound in the virtual space.

The processor 21 in accordance with the present embodiment generates data on minute vibration that occurs when the aircraft glides. The processor 21 then transmits, to the interface apparatus 1, data on the vibration generated, via the communication module.

Further, the processor 21 determines a tilt direction and a tilt angle of the control bar 11 on the basis of a state of the atmosphere in the virtual space and a posture of the user U which has been specified by the force and the moment. The "state" refers to, for example, directions and strengths of wind and air currents. For example, in a case where the user U pushes (pulls) the arms thereof (in a case where the force sensors 13 detect a forward (backward) force at the control bar 11), the processor 21 provides the interface apparatus 1 with a control signal that instructs the control bar 11 to be tilted forward (backward). In addition, in a case where the user U applies the weight of the user U on a right (left) side (in a case where the force sensors 13 detect a downward force at the right end portion (left end portion) of the control bar 11), the processor 21 provides the interface apparatus 1 with a control signal that instructs the control bar 11 to be tilted to slope diagonally downwards to the right (diagonally downwards to the left). The processor 21 repeatedly detects, at a predetermined cycle, a force and a moment that act on the control bar 11. Thus, in accordance with a temporal change in a state of the atmosphere in the virtual space (movement of the scenery in the virtual space), the processor 21 determines the tilt direction and the tilt angle each of which differs accordingly.

Note that, for example, the processor 21 may be configured to acquire data on an image which has been taken by a wearable camera worn by an experienced hang gliding pilot and which captures the experienced pilot actually performing hang gliding, and to generate a VR image on the basis of the data. Such a configuration enables the user U to feel as if the user U experienced the high-level hang gliding performed by the experienced pilot. Alternatively, the processor 21 may be configured to acquire data on an image which has been taken at a distance from an experienced pilot and which captures the experienced pilot actually performing hang gliding, and to generate the virtual space on the basis of the data. Such a configuration provides the user U with feeling as if the user U performed hang gliding side by side with the experienced pilot and thus adds charm to the experience.

In addition, in a case where a plurality of interface apparatuses 1 and a plurality of HMDs 3 are connected with the processor 21, the processor 21 may be configured to generate, as a virtual space to be provided to each HMD, a virtual space showing an avatar of a user other than a user wearing the HMD. For example, when first and second users who wear their respective HMDs 3 experience hang gliding with use of different interface apparatuses 1, the HMD 3 of the first user (second user) is provided with data on the virtual space showing an avatar of the second user (an avatar of the first user). This enables a plurality of users to enjoy hang gliding together in the virtual space and showcase skills of hang gliding in competition in the virtual space. If the number of the users increases, it is possible to hold a competition offering a cash reward in the virtual space. Alternatively, the processor 21 may be configured to generate a virtual space other than a VR image and an avatar of the user U present in the virtual space. In this case, the processor 21 may be configured to change a posture of the avatar on the basis of the state of the atmosphere in the virtual space and the posture of the user U.

In addition, the processor 21 may be configured to generate a sound in the virtual space and transmit the sound to the HMD 3. The sound includes, for example, a sound that occurs when the aircraft and the user sail across sky, a sound that occurs when the sail of the aircraft flaps, and wireless communications with a person on the ground.

[Head Mounted Display]

The HMD 3 displays an image which represents the virtual space and which has been acquired from the simulation apparatus 2. Further, the HMD 3 is worn on the head of the user U when the user U rides on the control bar 11. This makes it possible to provide the user U with realistic feeling as if the user U existed in the virtual space. The simulation apparatus 2 in accordance with the present embodiment generates a VR image and thus enables the user U wearing the HMD 3 to feel as if the user U existed in a more realistic virtual space. In addition, the simulation apparatus 2 in accordance with the present embodiment generates an image of a virtual space in which the surrounding scenery is moving backward and thus enables the user U wearing the HMD 3 to feel as if the user U was moving forward. Further, the HMD in accordance with the present embodiment is configured to display, in the virtual space (an end of a display part of the HMD 3), flight information indicative of at least one selected from the group consisting of a location, an altitude, and a flight velocity on the basis of information that has been acquired from the simulation apparatus 2. In a case where the simulation apparatus 2 changes at least one selected from the group consisting of a location, an altitude, and a flight velocity in accordance with the switching signal, the HMD 3 changes the flight information displayed.

At least while the user U experiences hang gliding, the HMD 3 in accordance with the present embodiment emits light in a direction in which the user U's face is oriented. The light needs only differ from light in the interior of the room in which the interface apparatus 1 is installed and may be, for example, visible light or infrared light. The light emitted from the HMD 3 is detected by any of the plurality of photodetectors 14 provided around the interface apparatus 1.

Note that the HMD 3 may contain a speaker. In this case, the HMD 3 may be configured to output a sound in the virtual space which has been acquired from the simulation apparatus 2.

<Operation of Hang Gliding Experience System (Interface Apparatus)>

The system S configured as above starts its operation when a predetermined start condition is satisfied. Examples of the start condition include the followings: the system S (interface apparatus 1) is turned on; the user U grips the control bar 11; and the user U performs a predetermined start operation.

When the system S starts its operation, the simulation apparatus 2 first generates a virtual space (step A1) and then provides the data on the virtual space to the HMD 3 worn by the user U (step A2), as illustrated in FIG. 3. The HMD 3 that has received the data on the virtual space displays an image of the virtual space on a display part of the HMD 3 (step B1). Then, the scenery in the virtual space starts moving, and an experience of hang gliding starts.

While the HMD 3 displays the virtual space, the interface apparatus 1 repeatedly detects, at a predetermined cycle, a force and a moment which act on the control bar 11 (step C1). Every time the force and the moment are detected, the interface apparatus 1 provides a detection signal to the simulation apparatus 2 (step C2).

The simulation apparatus 2 that has acquired the detection signal repeatedly determines a tilt direction and a tilt angle of the control bar 11 based on a state of the atmosphere in the virtual space generated and a posture of the user U which has been specified by the detection signal (step A3). Every time the tilt direction and the tilt angle are determined, the simulation apparatus 2 provides the interface apparatus 1 with a control signal indicating the determined tilt direction and tilt angle (step A4). The interface apparatus 1 that has acquired the control signal then controls the tilt mechanism so as to tilt the control bar 11 at the tilt direction and the tilt angle indicated by the control signal (step C3).

<Effects of Hang Gliding Experience System>

The interface apparatus 1 in accordance with the present embodiment tilts the control bar 11 with use of the tilt mechanism 12. Thus, the user can tilt the control bar relative to the user. Therefore, the interface apparatus 1 or the system S enables the user to experience a more realistic movement of the control bar in hang gliding in the virtual space.

<Variation>

The present invention is not limited to the embodiments, but can be altered by a skilled person in the art within the scope of the claims. That is, the present invention also encompasses, in its technical scope, any embodiment derived by combining technical means disclosed in differing embodiments as appropriate.

For example, the HMD 3 includes a sensor that detects movement of the head of the user U (for example, a gyrosensor) instead of a function of emitting light. In this case, the interface apparatus 1 may not include the photodetectors 14.

Furthermore, the system S may include an air blower which is not illustrated. This air blower is provided in front of the user U so as to blow air toward the user U. The air blower is connected with the simulation apparatus 2 and adjusts a wind velocity in accordance with the velocity at which the user U flies in the virtual space. This causes wind to be blown toward the user U in accordance with movement of the user U and thus makes it possible to further improve reality of a hang gliding experience in the virtual space. Note that the system S may be configured to be able to change a direction in which air is blown toward the user U. Specifically, for example, the air blower may be configured to be movable around the user U. Alternatively, an air blower other than the one provided in front of the user U may be provided, for example, beside the user U. In this case, the simulation apparatus 2 may be configured to tilt the control bar 11 in accordance with change in a direction of the wind. Such a configuration makes it possible to simulate, for example, occurrence of crosswinds and thus enables the user U to experience more difficult hang gliding.

The system S may include a cushioning material below the interface apparatus 1 (for example, on the floor surface of a room in which the system S is installed). If the user U falls due to, for example, breakage of the hang strap 16 or the harness 17 or a defect in engagement between the hang strap 16 and the harness 17, this configuration allows the user U to be received by the cushioning material and thus can prevent the user U from being injured.

Further, some or all of the functions of the processor can be achieved also by a logic circuit. For example, the present invention encompasses, in its scope, an integrated circuit in which a logic circuit that functions as each of the above-described control blocks is formed. In addition, the function of each of the control blocks can be realized by, for example, a quantum computer.

Aspects of the present invention can also be expressed as follows:

An interface apparatus in accordance with Aspect 1 of the present invention is an interface apparatus for providing a user with a hang gliding experience in a virtual space, the interface apparatus including: a control bar which the user is to grip; a tilt mechanism which supports the control bar from above such that the control bar is tiltable; a force sensor that is provided to the tilt mechanism and that detects a force and a moment which are applied from the user to the control bar; and an input and output section that provides a signal indicative of the force and the moment to a simulation apparatus configured to generate the virtual space and that acquires, from the simulation apparatus, a control signal for controlling the tilt mechanism so as to tilt the control bar.

An interface apparatus in accordance with Aspect 2 of the present invention may be configured, in Aspect 1, such that the tilt mechanism is a parallel link mechanism.

A hang gliding experience system in accordance with Aspect 3 of the present invention may be configured such that the hang gliding experience system includes: the interface apparatus in accordance with Aspect 1 or 2; and the simulation apparatus, the simulation apparatus determining a tilt direction of the control bar and a tilt angle of the control bar in view of a state of an atmosphere in the virtual space and a posture of the user which posture has been specified by the force and the moment.

A hang gliding experience system in accordance with Aspect 4 of the present invention may be configured, in Aspect 3, to further include a head mounted display which displays an image that represents the virtual space and that has been acquired from the simulation apparatus.

The invention claimed is:

1. An interface apparatus comprising:
   a control bar which a user is to grip;
   a tilt mechanism which supports the control bar from above such that the control bar is tiltable, the tilt mechanism being fixed to a ceiling of a room in which the interface apparatus is installed;
   a force sensor that is provided to the tilt mechanism and that detects a force and a moment which are applied from the user to the control bar;
   a harness that supports a trunk and legs of the user such that the trunk and the legs of the user extend horizontally, the harness being hung from the tilt mechanism or the ceiling; and
   an input and output section that provides a signal indicative of the force and the moment to a simulation apparatus configured to generate a virtual space and that acquires, from the simulation apparatus, a control signal for controlling the tilt mechanism so as to tilt the control bar,
   the tilt mechanism including:
     a base fixed to the ceiling;
     a plurality of movable links having upper end portions each coupled to a peripheral portion of the base; and
     a tilt member having an upper surface a peripheral portion of which is coupled to each of lower end portions of the plurality of movable links,
   the control bar including:
     a pair of uprights that have upper end portions fixed to the tilt member and that extend downward; and
     a base bar having left and right end portions fixed to respective lower end portions of the pair of uprights,
   the force sensor being attached to the base,
   the force sensor detecting strain that occurs in the base when the user attempts to move the base bar,
   the force and the moment being calculated on a basis of the strain.

2. The interface apparatus according to claim 1, wherein the tilt mechanism is a parallel link mechanism.

3. A hang gliding experience system comprising:
   the interface apparatus according to claim 1; and
   the simulation apparatus,
   the simulation apparatus determining a tilt direction of the control bar and a tilt angle of the control bar in view of a state of an atmosphere in the virtual space and a posture of the user which posture has been specified by the force and the moment.

4. The hang gliding experience system according to claim 3, further comprising a head mounted display which displays an image that represents the virtual space and that has been acquired from the simulation apparatus.

* * * * *